United States Patent

[11] 3,590,301

| [72] | Inventor | Gunter Woydt |
| | | Erlangen, Germany |
| [21] | Appl. No. | 31,615 |
| [22] | Filed | Apr. 24, 1970 |
| [45] | Patented | June 29, 1971 |
| [73] | Assignee | Siemens Aktiengesellschaft |
| | | Berlin and Munich, Germany |
| [32] | Priority | Apr. 25, 1969 |
| [33] | | Germany |
| [31] | | P 19 22 153.5 |

[54] ROTOR FOR DYNAMOELECTRIC MACHINE
4 Claims, 2 Drawing Figs.

[52] U.S. Cl. ............................................. 310/269,
310/208, 310/218
[51] Int. Cl. ........................................... H02k 1/24
[50] Field of Search.......................................... 310/269,
218, 208, 261

[56] References Cited
UNITED STATES PATENTS
| 3,076,110 | 1/1963 | Larson et al. | 310/208 X |
| 2,660,681 | 11/1953 | Horne | 310/208 X |

*Primary Examiner*—Milton D. Hirshfield
*Assistant Examiner*—B. A. Reynolds
*Attorneys*—A. T. Stratton and F. P. Lyle ABSTRACT: A four-pole rotor is provided for dynamoelectric machines in which the exciting winding consists of a plurality of coils, preferably wound of strap conductors, which are constructed so that they can be inserted radially over the pole members and held in place with each coil engaging the same sides of two diametrically opposite poles. In this way the windings can be applied after complete assembly of the rotor, permitting more secure attachment of the poles to the rotor body.

PATENTED JUN 29 1971

3,590,301

ROTOR FOR DYNAMOELECTRIC MACHINE

BACKGROUND OF THE INVENTION

The present invention relates to four-pole rotors for synchronous dynamoelectric machines having salient poles and preferably strap-wound exciting windings. In the conventional construction of such machines, each pole has its own exciting coil and the coils are frequently made of strap conductors which are wound edgewise in a rectangular configuration to extend around all four sides of the pole body. The coil is retained in position on the pole by the pole tips which extend over the coil on each side of the pole, and it is necessary with this construction to assemble the coil on the pole member before the pole is attached to the rotor body or yoke. This is usually done by dovetail attachments, or equivalent means, and the pole member must be very securely attached to the rotor body in order to be capable of transmitting the torque to or from the shaft and to withstand the centrifugal forces which occur during operation of the machine. A possible alternative construction has also been proposed in which the rotor body comprises a spider member with longitudinal ribs or projections on which the pole bodies can be attached by welding or brazing. The coils can then be applied over the pole bodies and pole shoes attached to complete the assembly and retain the coils in position. This of course has the disadvantage of requiring two points of attachment for each complete pole as well as increased cost of construction.

SUMMARY OF THE INVENTION

The present invention provides a construction for four-pole rotors which avoids the disadvantages discussed above by a special arrangement of the field coils which makes it possible to assemble them on the poles after the rotor has been completely assembled. In accordance with the invention, the exciting windings consist of four coils which are preferably wound with strap conductors in a rectangular configuration having an open area of a width not less than the width of an assembled pole member and coil. Two of the coils are made longer than the other two, the coils otherwise being similar. The two shorter coils can then be applied in the radial direction over two diametrically opposite pole members to engage the sides of the other two opposite pole members, each coil engaging the same side of two diametrically opposite poles. The two longer coils are then similarly applied over the other two poles with their ends extending beyond the ends of the shorter coils so as to extend around them and assist in holding them in position. In this way the windings can be applied after the rotor has been completely assembled with the poles in place since the windings are applied radially over the pole members and the poles do not interfere with the assembly of the windings.

This arrangement has many advantages. Thus the strap conductors with which the coils are preferably wound can be wound flatwise which is easier and more desirable than the edgewise winding which is necessary for conventional coils. Since the poles are completely assembled in place before the windings are applied, it is possible to make the poles integral with the rotor body or, in the case of laminated poles, to build them up from generally circular punchings with the pole members formed integrally. This results in a much more secure attachment of the poles to the rotor body than has previously been possible, and adequate strength to withstand the torques and centrifugal forces to which the poles are subjected is readily obtained.

DESCRIPTION OF THE DRAWINGS

The invention will be more fully understood from the following detailed description, taken in connection with the accompanying drawings, in which.

DESCRIPTION OF A PREFERRED EMBODIMENT

Figure 2:
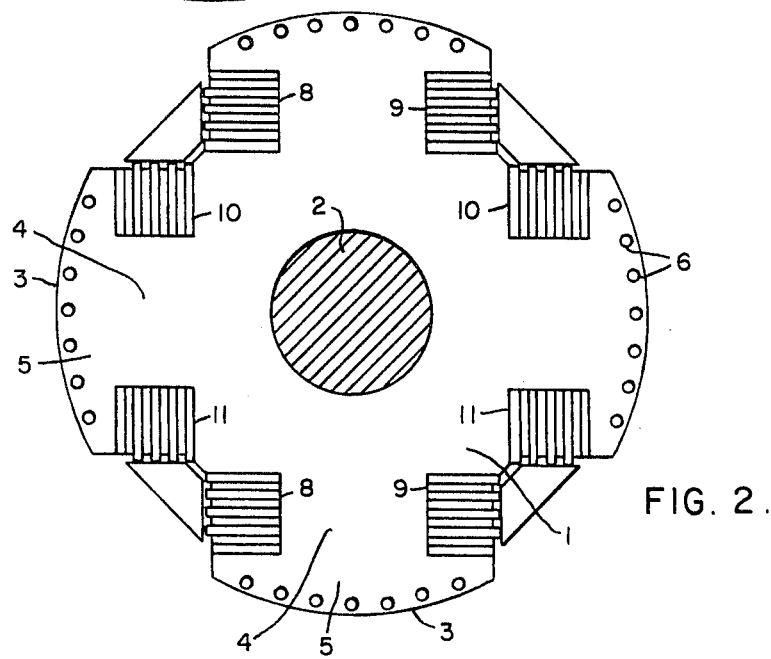
FIG. 2 is a transverse sectional view of the rotor of FIG. 1.

The drawing shows a four-pole rotor having a rotor body built up of generally circular punching or laminations 1 secured on a solid shaft 2. As shown in FIG. 2, the laminations 1 are generally circular with a central bore for reception of the shaft 2. Four equally spaced salient pole members 3 are integrally formed about the periphery of the punching 1. Each pole 3 has a generally radial body or core portion 4 and a pole shoe portion 5 having laterally extending pole tips.

The punchings 1 are assembled to form a rotor body of the desired length and are then pressed or otherwise securely attached on the solid shaft 2. Damper bars 6 are inserted through openings provided in the pole shoes and connected at their ends by short-circuiting plates 7 secured to the pole bodies in any suitable manner and brazed or otherwise connected to the damper bars 6.

Figure 1:
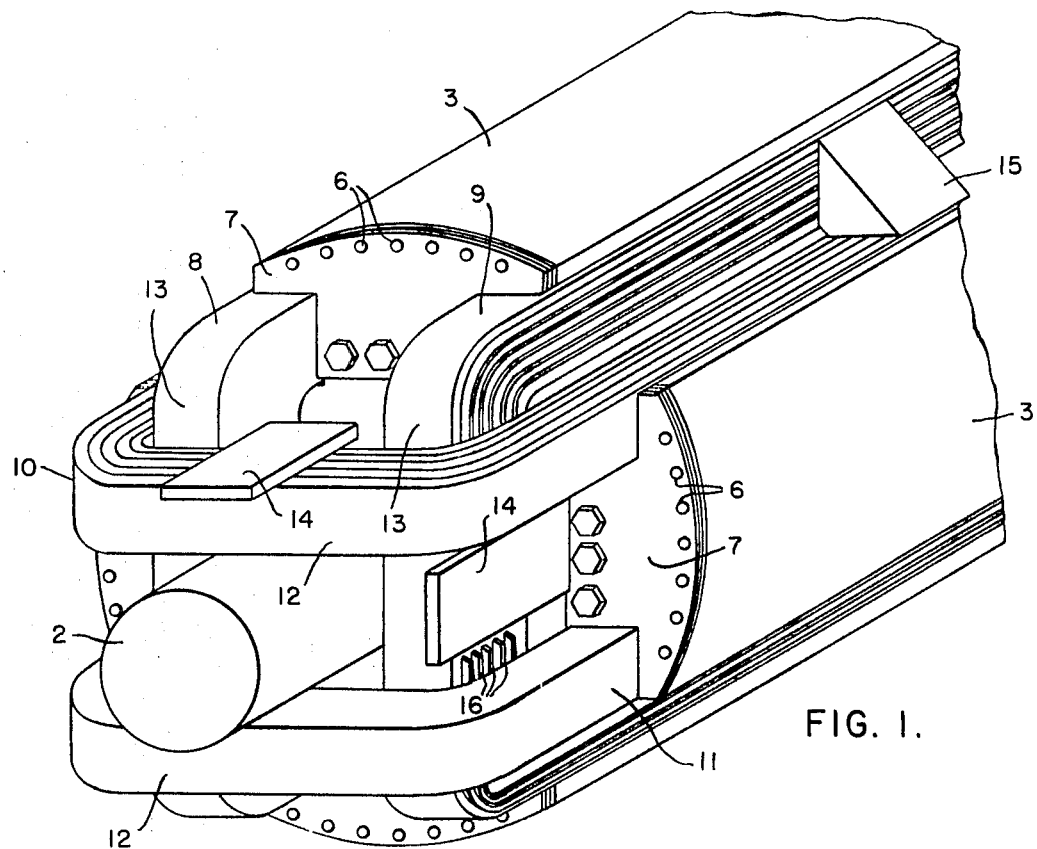
FIG. 1 is a perspective view of a rotor embodying the invention.

Four exciting coils 8, 9, 10 and 11 are provided. These coils are preferably wound from strap conductors, as shown in the drawing, and the conductors are wound flatwise as illustrated in a generally rectangular configuration. Each coil has a central open area and the width of this area is made not less than the width of an assembled pole member and coil, which is substantially the same as the width of a pole shoe across the pole tips 5. Thus the coil has sufficient width to pass over a complete pole. As illustrated in FIG. 1, one pair of coils 8 and 9 is made of equal length, and the other pair of coils 10 and 11 is made longer and also of equal lengths, the coils otherwise being the same.

In assembling the coils on the rotor, the coils 8 and 9 are first applied by inserting them radially of the rotor over oppositely extending pole members. These coils thus lie in parallel planes on opposite sides of the shaft, as shown in FIG. 1, and each coil engages the same side of two diametrically opposite poles. The two longer coils 10 and 11 are then similarly inserted radially over the two poles on which the shorter coils are already in place, and thus lie in planes at right angles to the planes of the first two coils in corresponding positions, each of the coils 10 and 11 engaging the same side of the other two diametrically opposite poles. Since the two coils 10 and 11 are longer than the first two coils 8 and 9, they can be positioned over them as shown in the drawing with the end turn portions 12 of the coils 10 and 11 extending across and enclosing the end turn portions 13 of the coils 8 and 9. The coils are further held in position by support plates 14 of any suitable type which are bolted or otherwise secured to the ends of the rotor body. The longitudinal sides of the coils are supported in position by braces or support members 15 which engage the sides of adjacent coils and are secured to the rotor body in any suitable manner.

It will be seen that each coil is securely retained in position by the extending pole tips of the poles which it engages as well as by the interengagement of the coils themselves at the ends and the secure mechanical bracing provided. As shown in FIG. 2, and illustrated at 16 in FIG. 1, the coils are preferably wound with alternate turns extending, or with equivalent vanes, in order to provide channels for heat dissipation.

It will now be apparent that a four pole rotor has been provided in which the field coils can be applied after complete assembly of the rotor itself including the poles so that construction of the rotor is greatly facilitated. Each pole is excited by magnetic flux produced by two separate coils on opposite sides of the pole and by properly connecting the coils it will be obvious that the magnetic effect is exactly the same as in the conventional constructions. An improved and relatively low cost rotor is thus provided. A preferred embodiment of the invention has been shown and described for the purpose of illustration, but it is to be understood that the invention is not so limited but includes all equivalent embodiments and modifications.

I claim:

1. A four pole rotor for a dynamoelectric machine comprising a shaft, four salient pole members supported on said shaft and equally spaced apart, four coils for excitation of said pole members, each of said coils being generally rectangular with an open area having a width not less than the width of an assembled pole member and coil, two of said coils being disposed in parallel planes on opposite sides of the shaft whereby each of said two coils engages the same side of two diametrically opposite pole members, the other two of said coils being similarly disposed in planes at right angles to the first-mentioned planes to engage the other two diametrically opposite pole members.

2. A rotor as defined in claim 1 in which the first-mentioned two coils are shorter in axial length than the last-mentioned two coils and the ends of the longer coils extend across and enclose the ends of the shorter coils.

3. A rotor as defined in claim 1 in which each of the coils comprises a plurality of turns of strap conductor wound flatwise.

4. A rotor as defined in claim 1 having a body portion consisting of a plurality of generally circular laminations, the pole members being formed on the periphery of the laminations and the laminations being secured on the shaft.